United States Patent
Sun (10) Patent No.: US 10,307,862 B2
(45) Date of Patent: Jun. 4, 2019

(54) LASER MICROMACHINING WITH TAILORED BURSTS OF SHORT LASER PULSES

(75) Inventor: Yunlong Sun, Beaverton, OR (US)

(73) Assignee: ELECTRO SCIENTIFIC INDUSTRIES, INC, Portland, OR (US)

(*) Notice: Subject to any disclaimer, the term of this patent is extended or adjusted under 35 U.S.C. 154(b) by 2300 days.

(21) Appl. No.: 12/413,350

(22) Filed: Mar. 27, 2009

(65) Prior Publication Data

US 2010/0246611 A1 Sep. 30, 2010

(51) Int. Cl.
*H01S 3/098* (2006.01)
*H01S 3/10* (2006.01)
(Continued)

(52) U.S. Cl.
CPC ...... *B23K 26/0624* (2015.10); *B23K 26/0622* (2015.10); *B23K 26/40* (2013.01);
(Continued)

(58) Field of Classification Search
CPC ..... G04D 3/0071; H01S 3/11; B23K 26/0639; B23K 26/0622; B23K 26/0624; H03D 2200/0084; H03D 7/1441; H03D 7/1458; H03D 7/1466; H03D 7/165; H04B 1/04; H04B 1/408; H04B 2001/0408
(Continued)

(56) References Cited

U.S. PATENT DOCUMENTS 3,962,558 A * 6/1976 Kocher et al. ........... 219/121.71
4,114,018 A    9/1978 Von Allmen et al.
(Continued)

FOREIGN PATENT DOCUMENTS

JP    2000202668       7/2000
JP    2008521611 A2    6/2008
(Continued)

OTHER PUBLICATIONS

Nebel, Achim et al, Generation of Tailored Picosecond-Pulse-Trains for Micro-Machining; Phototonics West 2006, LASE Conference: Commercial and Biomedical Applications of Ultrafast Lasers VI; Paper No. 6108-37.
(Continued)

*Primary Examiner* — Tu B Hoang
*Assistant Examiner* — Diallo I Duniver (57) ABSTRACT

A series of laser pulse bundles or bursts are used for micromachining target structures. Each burst includes short laser pulses with temporal pulse widths that are less than approximately 1 nanosecond. A laser micromachining method includes generating a burst of laser pulses and adjusting an envelope of the burst of laser pulses for processing target locations. The method includes adjusting the burst envelope by selectively adjusting one or more first laser pulses within the burst to a first amplitude based on processing characteristics of a first feature at a target location, and selectively adjusting one or more second laser pulses within the burst to a second amplitude based on processing characteristics of a second feature at the target location. The method further includes directing the amplitude adjusted burst of laser pulses to the target location.

6 Claims, 9 Drawing Sheets

(51) Int. Cl.
    *B23K 26/0622*     (2014.01)
    *B23K 26/40*     (2014.01)
    *B23K 103/10*     (2006.01)
    *B23K 103/12*     (2006.01)
    *B23K 103/16*     (2006.01)
    *B23K 103/00*     (2006.01)

(52) U.S. Cl.
    CPC ...... *B23K 2103/10* (2018.08); *B23K 2103/12* (2018.08); *B23K 2103/172* (2018.08); *B23K 2103/30* (2018.08); *B23K 2103/42* (2018.08); *B23K 2103/50* (2018.08); *B23K 2103/52* (2018.08)

(58) Field of Classification Search
    USPC .................................. 219/121.6; 372/18, 25
    See application file for complete search history.

(56) References Cited

U.S. PATENT DOCUMENTS

| | | | |
|---|---|---|---|
| 5,319,195 A * | 6/1994 | Jones et al. ............... 250/227.11 |
| 5,742,634 A * | 4/1998 | Rieger et al. .................... 372/25 |
| 6,281,471 B1 | 8/2001 | Smart |
| 6,462,307 B1 | 10/2002 | Hennig et al. |
| 6,552,301 B2 | 4/2003 | Herman et al. |
| 6,574,250 B2 | 6/2003 | Sun et al. |
| 6,727,458 B2 | 4/2004 | Smart |
| 7,256,930 B2 | 8/2007 | Liu |
| 7,348,516 B2 | 3/2008 | Sun et al. |
| 7,420,995 B2 | 9/2008 | Sun |
| 7,491,909 B2 | 2/2009 | Yamamoto et al. |
| 7,616,669 B2 | 11/2009 | Grant et al. |
| 7,671,295 B2 | 3/2010 | Sun et al. |
| 7,732,731 B2 | 6/2010 | Gu |
| 8,415,586 B2 | 4/2013 | Lei et al. |
| 2002/0009843 A1* | 1/2002 | Kyusho et al. ............... 438/200 |
| 2002/0167581 A1* | 11/2002 | Cordingley et al. .......... 347/173 |
| 2002/0167974 A1 | 11/2002 | Kennedy et al. |
| 2003/0183603 A1* | 10/2003 | Forsman et al. ............ 219/121.6 |
| 2004/0134894 A1 | 7/2004 | Gu et al. |
| 2004/0188399 A1* | 9/2004 | Smart ...................... 219/121.69 |
| 2005/0041702 A1 | 2/2005 | Fermann et al. |
| 2005/0041976 A1* | 2/2005 | Sun et al. ........................ 398/92 |
| 2005/0236378 A1* | 10/2005 | Boyle et al. ............. 219/121.67 |
| 2005/0255715 A1* | 11/2005 | Cheng et al. .................. 438/795 |
| 2006/0056468 A1 | 3/2006 | Dantus et al. |
| 2006/0108337 A1* | 5/2006 | Gu et al. .................. 219/121.69 |
| 2006/0131285 A1* | 6/2006 | Sun et al. ................. 219/121.69 |
| 2006/0131288 A1 | 6/2006 | Sun et al. |
| 2006/0159138 A1 | 7/2006 | Deladurantaye et al. |
| 2006/0187974 A1 | 8/2006 | Dantus |
| 2007/0012665 A1 | 1/2007 | Nelson et al. |
| 2007/0199927 A1* | 8/2007 | Gu et al. .................. 219/121.69 |
| 2007/0272668 A1 | 11/2007 | Albelo et al. |
| 2008/0080570 A1 | 4/2008 | Murison et al. |
| 2008/0170218 A1 | 7/2008 | Dantus et al. |
| 2009/0141750 A1 | 6/2009 | Sun et al. |
| 2009/0245301 A1 | 10/2009 | Peng et al. |
| 2009/0245302 A1 | 10/2009 | Baird et al. |
| 2010/0118899 A1 | 5/2010 | Peng et al. |
| 2010/0177794 A1* | 7/2010 | Peng et al. ....................... 372/25 |
| 2010/0246611 A1 | 9/2010 | Sun |
| 2010/0276405 A1 | 11/2010 | Cho et al. |

FOREIGN PATENT DOCUMENTS

| | | |
|---|---|---|
| JP | 2008207210 | 11/2008 |
| KR | 1020100065384 A | 6/2010 |
| WO | 03084012 A1 | 9/2003 |
| WO | 2007092803 A2 | 8/2007 |

OTHER PUBLICATIONS

Office Action for U.S. Appl. No. 12/354,373, dated Feb. 14, 2012.
Notification of Transmittal of The International Search Report and The Written Opinion of the International Searching Authority, or the Declaration for application PCT/US2010/027644, dated Nov. 3, 2010.
Meier, M, et al., "Material Processing with pulsed radially and azimuthally polarized laser radiation," Appl. Phys. A 86, 329-334 (2007), University of Bern, Switzerland.

\* cited by examiner

LASER MICROMACHINING WITH TAILORED BURSTS OF SHORT LASER PULSES

TECHNICAL FIELD

The present disclosure relates to laser micromachining. In particular, the present disclosure relates to laser systems and methods that use a tailored burst of short or ultrashort laser pulses.

BACKGROUND INFORMATION

Laser micromachining processes include, for example, semiconductor memory link processing, material trimming, wafer/panel scribing, wafer/panel dicing, and via drilling. Generally, laser micromachining may use laser pulses having wavelengths of, for example, 1.3 µm, 1.064 µm, 1.053 µm, or 1.047 µm, and their harmonics, and pulse widths in a nanosecond range (e.g., between a few nanoseconds and approximately 200 nanoseconds), depending on the particular materials and target structure to be processed, the laser sources used, and the pulse repetition rates used. Laser micromachining processes such as wafer dicing, for example, may use mode-locked laser pulses with pulse widths that are less than approximately 1 nanosecond and pulse repetition rates that are between a few Hz and approximately 300 kHz or higher.

After manufacture of a semiconductor memory array chip is complete, integrated circuit (IC) patterns on an exposed surface of the chip are generally sealed with an electrically insulating layer of passivating material. Typical passivating materials include resins or thermoplastic polymers such as, for example, polyimide, $SiO_2$, or $SiN$. The purpose of this final "passivation" layer is to prevent the surface of the chip from reacting chemically with ambient moisture, to protect the surface from environmental particulates, and to absorb mechanical stress. Following passivation, the chip is mounted in an electronic package embedded with metal interconnects that allow probing and functional testing of the memory cells. When one of many memory cells is determined to be faulty, the cell is disabled by severing the conductive interconnects, or wires, linking that cell to its neighbors in the array. Wires to one of a plurality of "redundant" memory cells may also be severed to activate the redundant memory cell for replacement of the faulty cell. Disabling and/or activating individual memory cells by "link processing" or "link blowing" is accomplished by laser micromachining equipment that is capable of directing laser beam energy so as to selectively remove the link material in a highly localized region without imparting damage to the materials adjacent to, below, or above the target. Selectively processing a designated link may be achieved by varying the laser beam wavelength, spot size, pulse repetition rate, pulse shape, or other spatial or temporal beam parameters that influence the interaction of the target with the delivered laser energy.

Laser micromachining processes that entail post-processing of electrically conductive links in memory arrays or other types of IC chips use sharp pulses with a fast rising front edge (e.g., with a 0.1 to 10 nanosecond rise time) to achieve desired quality, yield, and reliability. To cleanly sever a link, the laser pulse penetrates the overlying passivation layer before cutting through the metal interconnect. The rising edge of a typical pulse from an existing solid-state laser varies with pulse width. Use of a traditional Gaussian-shaped laser pulse having a 5-20 nanosecond pulse width and a sloped, gradually rising front edge in link processing tends to cause an "over crater" in the passivation layer, especially if its thickness is too large or is uneven. Over cratering reduces the reliability of IC chips.

Rupture behavior of overlying passivation layers has been well analyzed by Yunlong Sun in his PhD dissertation entitled, "Laser processing optimization of semiconductor based devices" (Oregon Graduate Institute, 1997). Because passivation layer thickness is an important parameter, the optimal thickness of a particular passivation layer material may be determined by simulations based on Sun's analysis. Difficulty in maintaining wafer-level process control of the passivation layer during IC fabrication may result in non-optimal thickness and poor cross-wafer or wafer-to-wafer thickness uniformity. Therefore, optimizing characteristics of laser pulses used in post-processing may help to compensate for mis-targeted dimensions and sources of variation in the passivation layer.

U.S. Pat. No. 6,281,471 of Smart proposes using substantially square-shaped laser pulses for link processing. Such a sharp-edged pulse may be generated by coupling a master oscillator laser with a fiber amplifier (MOPA). This low power master oscillator employs a diode laser that is capable of generating a square-shaped pulse with a fast rise time. On the other hand, U.S. Pat. No. 7,348,516 of Yunlong Sun et al., which patent is assigned to the assignee of this patent application, states that, despite a vertical rising edge, a substantially square-shaped laser pulse is not the best laser pulse shape for link processing. Instead, Sun, et al. describes use of a specially tailored laser pulse shape that, in one embodiment, resembles a chair, with a fast rising peak or multiple peaks to most effectively process links, followed by a drop-off in signal strength that remains relatively flat at a lower power level before shutting off. Such a tailored laser pulse, with high peak power but low average power, has been successfully generated by what is called pulse slicing technology, which can be implemented by either electro-optical modulation (EOM) or acousto-optical modulation (AOM). For example, a conventional active Q-switched solid-state laser provides nanosecond seed pulses with high intensity and high pulse energy, and then a light-loop slicing device transforms a standard laser pulse into a desired tailored pulse shape.

U.S. patent application Ser. No. 12/057,264, of Xiaoyuan Peng et al., which application is assigned to the assignee of the present patent application, teaches a light-loop slicing scheme implemented, for example, in an ultraviolet (UV) laser system for semiconductor link processing. Alternatively, a specially tailored laser pulse may be generated by a MOPA (Master Oscillator, Power Amplifier) that employs a gain fiber as the power amplifier. Using a MOPA is advantageous in that it constitutes a stable signal source at a specified constant frequency.

U.S. Patent Application Publication No. 2006/0159138 of Pascal Deladurantaye describes a shaped-pulse laser in which two modulators shape a continuous wave (CW) light beam to generate various shaped pulses. However, generating a pulsed laser from a CW light beam is fairly inefficient, and thus requires more amplification. Because such a low peak-power signal may be influenced by noise, which causes pulse-to-pulse instability, the two modulators are preferably synchronized to maintain pulse stability and energy stability, thereby adding further complexity and cost.

The above systems and methods generally use laser pulses with pulse widths in the nanosecond range. However, laser pulses with pulse widths in the nanosecond range have disadvantages. As has been discussed in detail by Yunlong Sun, "Laser Processing Optimization for Semiconductor Based Devices" (unpublished doctoral thesis, Oregon Graduate Institute of Science and Technology, 1997), conventional laser link processing with nanosecond pulse width may rely on heating, melting, and evaporating the link, and creating a mechanical stress build-up to explosively open the overlying passivation layer with a single laser pulse. Such a conventional link processing laser pulse creates a large heat affected zone (HAZ) that could deteriorate the quality of the device that includes the severed link. For example, when the link is relatively thick or the link material is too reflective to absorb an adequate amount of the laser pulse energy, more energy per laser pulse is used to sever the link. Increased laser pulse energy increases the damage risk to the IC chip, including irregular or over sized opening in the overlying passivation layer, cracking in the underlying passivation layer, damage to the neighboring link structure and damage to the silicon (Si) substrate. However, using laser pulse energy within a risk-free range on thick links often results in incomplete link severing.

Thus, investigations have been performed for using ultrafast lasers (either picosecond or femtosecond lasers) to process semiconductor materials such as links in IC chips. However, the high peak power of a single ultrafast pulse may easily damage the underlying Si substrate, which is unacceptable in many applications. One solution to the problem of high peak power substrate damage caused by ultrafast lasers is to use a burst or train of ultrafast pulses with smaller peak powers. A pulse train with low peak intensity also has the effect of producing a smaller effective spot size in the material. A problem with using a train of ultrafast pulses is that many commercially available ultrafast lasers that use a pulse picker have pulse repetition rates in the 1 kHz to 200 kHz range. Without the pulse picker, a mode-locked laser runs at a fixed repetition rate that is typically in the tens of megahertz range. Such a repetition rate may be difficult to be directly applied to links because stage movement, typically approximately 400 mm/s, is too slow to move the "next" laser pulse to the "next" link within the laser pulse interval time of a few tens of nanoseconds.

U.S. Pat. No. 6,574,250 issued to Yunlong Sun et al., which patent is assigned to the assignee of the present patent application, uses bursts of ultrashort laser pulses to sever conductive links. The pulse width of each laser pulse within a burst may be between 25 picoseconds and 100 femtoseconds. U.S. Patent Application Publication No. 2007/0199927, of Bo Gu et al., uses a laser with at least one pulse having a pulse duration in a range between approximately 10 picoseconds and less than approximately 1 nanosecond. Achim Nebel et al. from Lumera Laser GmbH have demonstrated a passively mode-locked laser that uses digital timing control to generate sequences or groups of pulses. See, "Generation of Tailored Picosecond-Pulse-Trains for Micro-Machining," Photonics West 2006, LASE Conference: Commercial and Biomedical Applications of Ultrafast Lasers VI Paper No. 6108-37. The system taught by Achim Nebel et al. is based on a "double-switch" scheme generated by high-voltage electro-optical (EO) pulse-picker that drives a voltage passing a half wave of a Pockels cell and generates two HV pulses in one cycle. The delay time between groups of pulses is changeable.

SUMMARY OF THE DISCLOSURE

A series of laser pulse bundles or bursts are used for micromachining target structures. The target structures may be on or in semiconductor devices, for example, that have multiple layers. Each burst includes short laser pulses with temporal pulse widths that are less than approximately 1 nanosecond. In some embodiments, each laser pulse has a temporal pulse width in a range between approximately 1 nanosecond and approximately 100 femtoseconds.

In one embodiment, a laser micromachining method includes generating a burst of laser pulses and adjusting an envelope of the burst of laser pulses for processing target locations. The method includes adjusting the burst envelope by selectively adjusting one or more first laser pulses within the burst to a first amplitude based on processing characteristics of a first feature at a target location, and selectively adjusting one or more second laser pulses within the burst to a second amplitude based on processing characteristics of a second feature at the target location. The method further includes directing the amplitude adjusted burst of laser pulses to the target location.

In another embodiment, a laser micromachining method includes generating bursts of laser pulses, adjusting a burst envelope of a first burst of laser pulses based on a first target type, and adjusting a burst envelope of a second burst of laser pulses based on a second target type. The method further includes directing the first burst of laser pulses to a first target location of the first target type, and directing the second burst of laser pulses to a second target location of the second target type. In certain such embodiments, the amplitude of one or more pulses within a burst is set to approximately zero such that the burst forms a "double burst."

Additional aspects and advantages will be apparent from the following detailed description of preferred embodiments, which proceeds with reference to the accompanying drawings.

DETAILED DESCRIPTION OF PREFERRED EMBODIMENTS

In certain embodiments, a series of laser pulse bundles or bursts are used for micromachining target structures. The target structures may be on or in semiconductor devices, for example, that have multiple layers with different laser processing characteristics. Or, the target structures may include a single material that has multiple laser processing characteristics. For example, a top surface of the material, a bulk or inner portion of the material, and a bottom surface of the material may have different laser processing characteristics. Further, the laser processing characteristics may vary at different depths within the material.

Each burst includes short laser pulses with temporal pulse widths that are less than approximately 1 nanosecond. In some embodiments, each laser pulse has a temporal pulse width in a range between approximately 1 nanosecond and approximately 100 femtoseconds. Temporal pulse widths that are less than approximately 10 picoseconds may be referred to herein as "ultrashort" or "ultrafast" laser pulses.

In certain embodiments, a burst includes a plurality of short or ultrashort, mode-locked laser pulses. In other embodiments, the plurality of short or ultrashort laser pulses are generated by laser sources that are not mode-locked. Laser pulse parameters (e.g., such as pulse energy and peak power) of each pulse in the burst may be individually controlled based on the characteristics of different features or layers of a target structure, or different processing requirements. For example, one or more first laser pulses in a burst may be configured to process a first layer of a semiconductor device, one or more second laser pulses may be configured to process a second layer of the semiconductor device, and additional pulses in the burst may be configured to process additional layers in the semiconductor device. Thus, by selectively controlling an amplitude profile or envelope of the laser pulse burst, laser processing quality is increased for each feature of the target structure. Further, bursts of short or ultrashort laser pulses deliver more total laser energy to the target structure with lower peak intensity, as compared to using a single short or ultrashort laser pulse.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

Figure 1A:
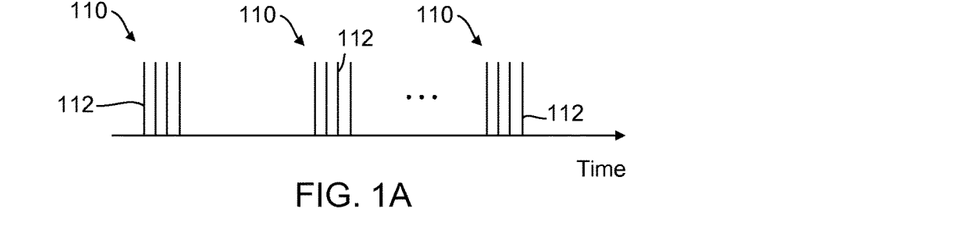
FIGS. 1A and 1B graphically illustrate laser pulse bursts according to one embodiment.
Figure 1B:
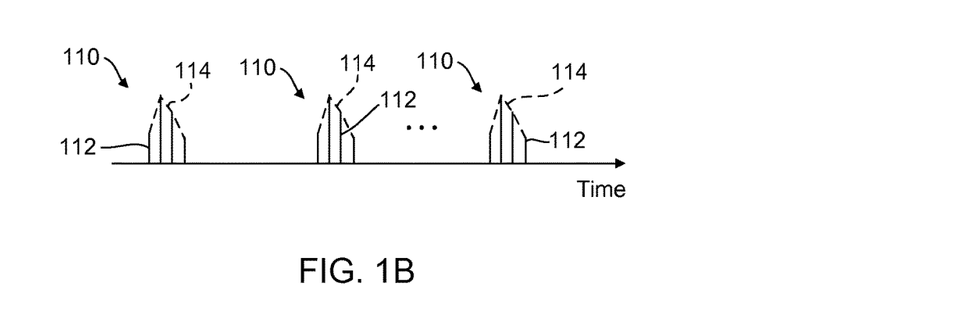

FIGS. 1A and 1B graphically illustrate laser pulse bursts 110 according to one embodiment. Each burst 110 includes a plurality of short or ultrashort laser pulses 112. In this example, each burst 110 includes four laser pulses 112. An artisan will understand from the disclosure herein, however, that a burst 110 may include any number of laser pulses 112. In one embodiment, for example, each burst 110 may include between three and ten laser pulses 112.

As discussed above, each laser pulse 112 has a temporal pulse width that is less than approximately 1 nanosecond. In certain embodiments, the temporal pulse width of each laser pulse 112 is in a range between approximately 1 nanosecond and approximately 100 femtoseconds. In addition, or in other embodiments, the pulse repetition rate of the laser pulses 112 within a burst 110 is in a range between approximately 100 kHz and approximately 300 MHz. In other embodiments, the pulse repetition rate of the laser pulses 112 within a burst 110 is in a range between approximately 100 kHz and approximately 500 MHz. In addition, or in other embodiments, the wavelength of each laser pulse 112 is in a range between approximately 2 µm and approximately 0.2 µm. In addition, or in other embodiments, successive bursts 110 may repeat at a rate between approximately 1 kHz and approximately 500 kHz. In addition, or in other embodiments, the temporal width of each burst 110 is in a range between approximately 1 nanosecond and approximately 1 microsecond.

As shown in FIG. 1A, each laser pulse 112 within a burst 110 may be generated with the same amplitude. As shown in FIG. 1B, the amplitude of each laser pulse 112 may be individually adjusted such that each burst 110 has a desired amplitude profile or burst envelope 114. The shape of the burst envelope 114 may be selected based on the intended target structure, or processing requirements. For example, as discussed above, the amplitude of one or more of the laser pulses 112 may be selected so as to process a first feature of a target structure, and the amplitude of one or more different laser pulses 112 may be selected so as to process a second feature of the target structure. Accordingly, two or more sequential laser pulses 112 within a burst 110 may have the same amplitude for processing the same feature, and two or more sequential laser pulses 112 within a burst may have different amplitudes for processing different features. Two or more sequential laser pulses 112 may also have different amplitudes for processing the same feature. For example, a first laser pulse 112 may have a first amplitude for removing a first portion of a feature at a target location, and a second laser pulse 112 may have a second amplitude for removing a second portion of the same feature at the target location.

Figure 2:
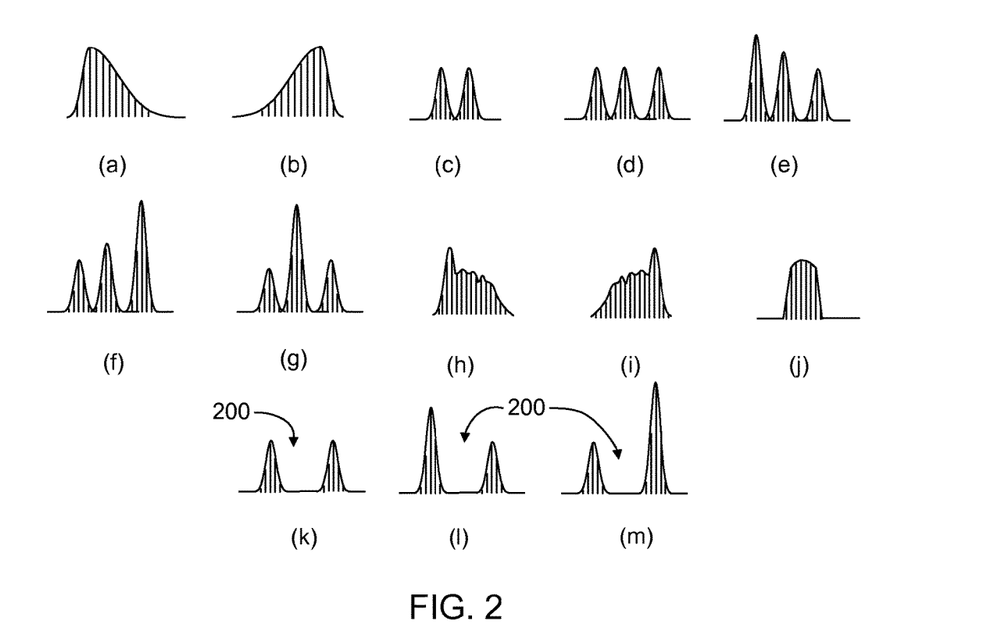
FIG. 2 graphically illustrates example burst envelopes that may be produced according to certain embodiments.

FIG. 2 graphically illustrates example burst envelopes that may be produced according to certain embodiments. While FIG. 2 illustrates 13 different burst envelope shapes (a), (b), (c), (d), (e), (f), (g), (h), (i), (j), (k), (l), and (m), an artisan will recognize that the illustrated shapes are provided by way of example only and that any number of different burst envelope shapes may be produced according to the systems and methods disclosed herein. Further, as discussed above, the selected envelope shape may be based on a particular target structure or material. As shown in FIG. 2, the amplitude of one or more of the laser pulses within a burst may be adjusted to approximately zero to form a gap 200 (see burst envelope shapes (k), (l), and (m)) between a first set of pulses within a burst and a second set of pulses within the burst. Thus, a burst may be configured to form two bursts or a "double burst."

For example, U.S. Pat. No. 7,348,516 of Yunlong Sun et al. (the "'516 patent"), which patent is assigned to the assignee of this patent application, describes the use of a specially tailored laser pulse shape that, in one embodiment, resembles a chair, with a fast rising peak or multiple peaks to most effectively process links, followed by a drop-off in signal strength that remains relatively flat at a lower power level before shutting off. Such a chair-shaped pulse corresponds to the burst envelope shape (h) shown in FIG. 2. In the '516 patent, a single nanosecond pulse is shaped, whereas the current application shapes a burst envelope corresponding to a plurality of short or ultrashort laser pulses. In other material processing applications, multiple peaks with desired separation times may be used, such as shown in the burst envelope shapes (c), (d), (e), (k), (l), and (m) in FIG. 2, to sequentially heat the material, remove a portion of the material to create a kerf, and clean out the kerf. Many other burst envelope shapes for many different applications will occur to those skilled in the art based on the embodiments herein.

Figure 3:
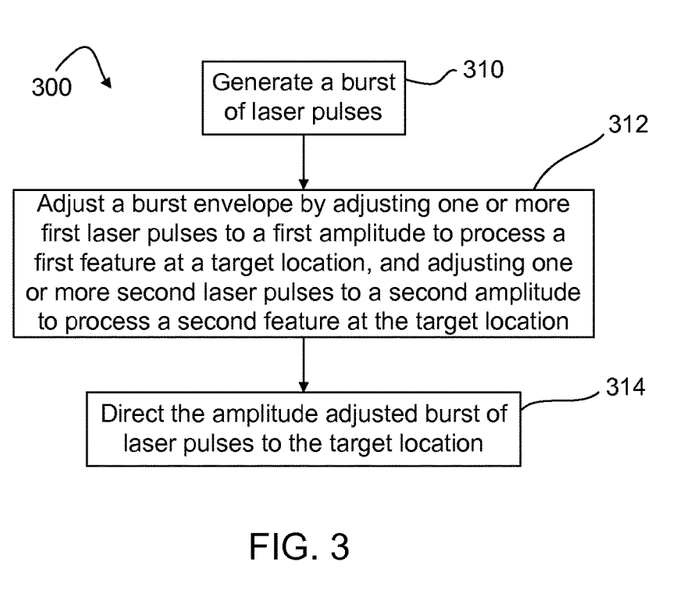
FIG. 3 is a flowchart of a laser micromachining process according to one embodiment.

FIG. 3 is a flowchart of a laser micromachining process 300 according to one embodiment. With reference to FIGS. 1A, 1B, and 3, the method 300 includes generating 310 a burst 110 of laser pulses 112. The method 300 also includes adjusting 312 a burst envelope 114 by adjusting one or more first laser pulses 112 to a first amplitude to process a first feature at a target location, and adjusting one or more second laser pulses to a second amplitude to process a second feature at the target location. The method 300 further includes directing 314 the amplitude adjusted burst 110 of laser pulses 112 to the target location.

Figure 4A:
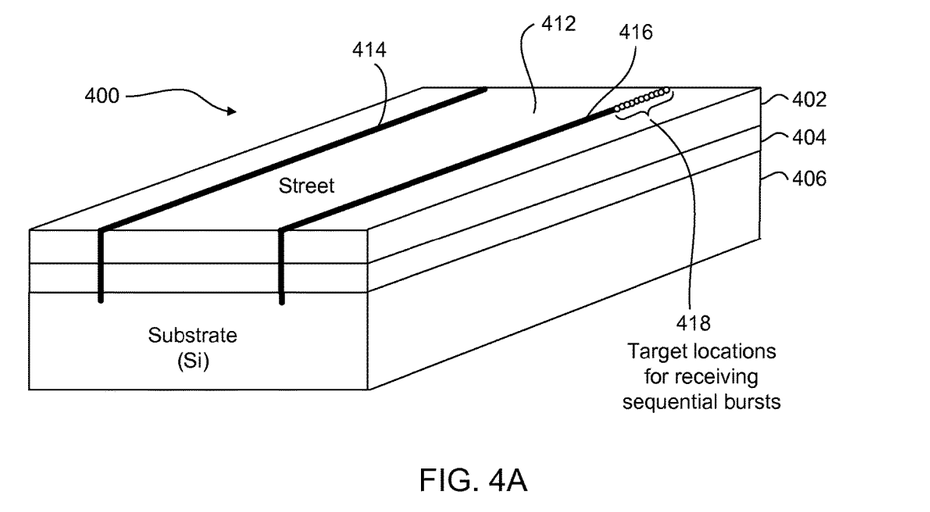
FIG. 4A is a perspective view of a multilayered semiconductor device that is scribed using sequential laser pulse bursts according to one embodiment.

Different types of targets may have different types of features for laser processing. For example, FIG. 4A is a perspective view of a multilayered semiconductor device or flat panel device 400 that is scribed using sequential laser pulse bursts 110 according to one embodiment. The device 400 includes layers 402, 404 formed over a substrate 406. The layers 402, 404 may include, for example, materials such as Cu, Al, $SiO_2$, SiN, fluorsilicated glass (FSG), organosilicated glass (OSG), SiOC, SiOCN, and other materials used in IC manufacture. Further, one of the layers 402, 404 may be a low-k passivation layer that includes, for example, an inorganic material such as SiOF or SiOB or an organic material such as polyimide-based or parylene-based polymer. The substrate 406 may include, for example, Si, FR4, glass, polymer, metal, composite material, and other materials used in IC manufacture.

Figure 4B:
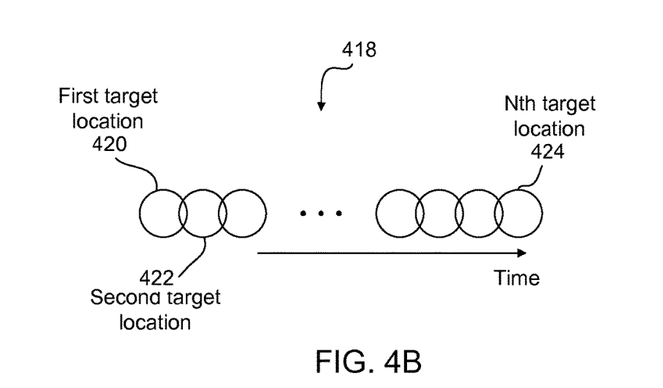
FIG. 4B schematically illustrates an enlarged top view of target locations shown in FIG. 4A according to one embodiment.

Electronic circuitry (not shown) may be formed in active device areas that are separated from each other by a street 412. In this example, the semiconductor device or flat panel device 400 is scribed such that laser kerfs 414, 416 are formed on both sides of the street 412. FIG. 4A illustrates adjacent target locations 418 in line with the laser kerf 416. For illustrative purposes, FIG. 4B schematically illustrates an enlarged top view of the target locations 418 shown in FIG. 4A according to one embodiment. As the laser kerf 416 continues to be formed in the device 400, a first laser pulse burst 110 illuminates a first target location 420. Then, a second laser pulse burst 110 illuminates a second target location 422. This process continues until an Nth laser pulse burst illuminates an Nth target location 424 to complete the laser kerf 416 in the device 400.

For the first laser pulse burst 110, for example, an amplitude of one or more first laser pulses 112 is configured so as to remove the top layer 402 so as to expose the underlying layer 404 at the first target location 420. Similarly, an amplitude of one or more second laser pulses 112 is configured so as to remove the layer 404 to form the kerf 416 at the first target location 420. Further, an amplitude of one or more third laser pulses 112 may be configured to remove part or all (e.g., for dicing) of the substrate 406.

Figure 5:
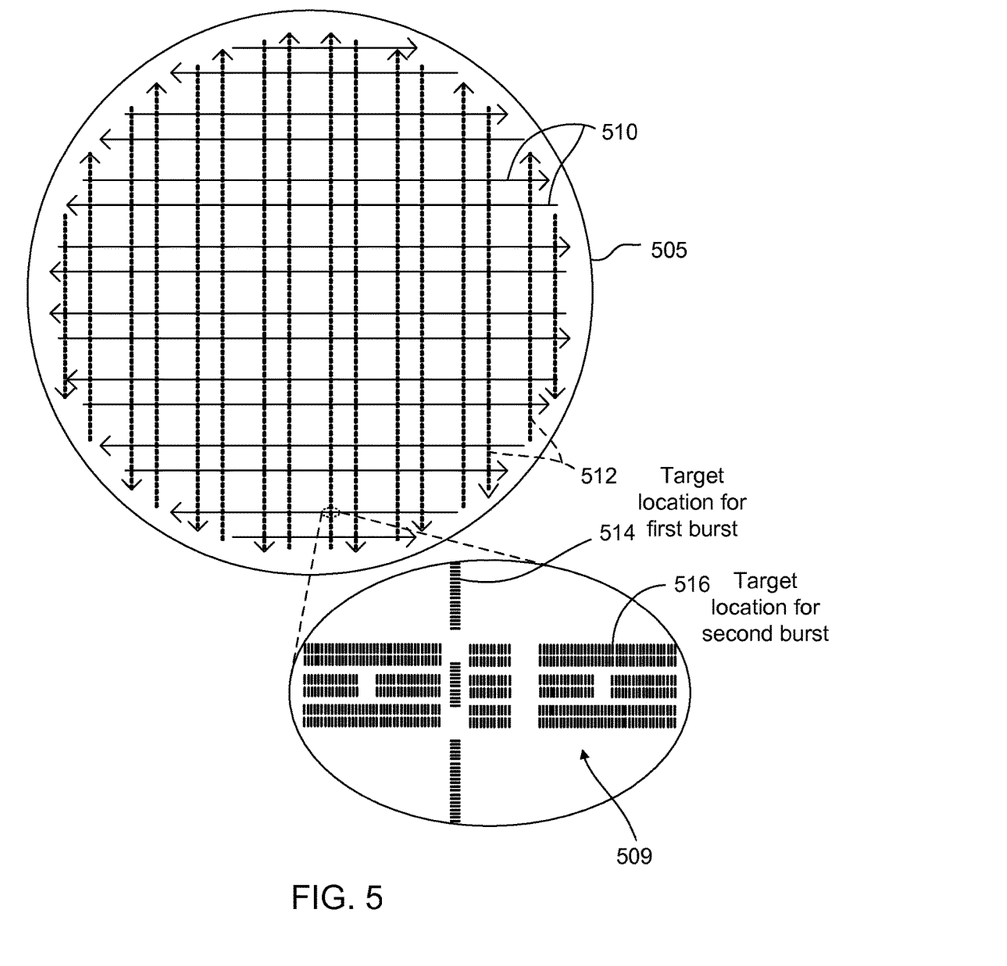
FIG. 5 schematically illustrates the processing of a wafer having electrically conductive links according to one embodiment.

As another example of the different types of targets and target features that may be processed with tailored bursts 110 of laser pulses 112, FIG. 5 schematically illustrates the processing of a wafer 505 having electrically conductive links 509 according to one embodiment. A sequential link blowing process includes scanning an XY motion stage (not shown) across the wafer 505 once for each link run 510. Repeatedly scanning back and forth across the wafer 505 results in complete wafer processing. A machine typically scans back and forth processing all X-axis link runs 510 (shown with solid lines) before processing the Y-axis link runs 512 (shown in dashed lines). This example is merely illustrative. Other configurations of link runs and processing modalities are possible. For example, it is possible to process links by moving the wafer or optics rail. In addition, link banks and link runs may not be processed with continuous motion.

For illustrative purposes, a portion of the wafer 505 near an intersection of an X-axis link run 510 and a Y-axis link run 512 is magnified to illustrate a plurality of links 509 arranged in groups or link banks. During link processing, a first target location 514 is illuminated with a first tailored burst 110 of laser pulses 112 to blow a one of the links 509. Then, a second target location 516 is illuminated with a second tailored burst 110 of laser pulses 112 to blow another link 509. Each tailored burst 110 may include one or more first laser pulses 112 configured to remove an overlying passivation layer (not shown), and one or more second laser pulses 112 configured to remove the link 509 at the corresponding target location 514, 516.

An artisan will recognize from the disclosure herein that many other target types and target features may be processed according to the embodiments herein. Further, the shape of each burst 110 may be dynamically selected based on the particular target type. Thus, devices with different target types may be processed with bursts 110 of laser pulses 112 having different burst envelopes.

Figure 6:
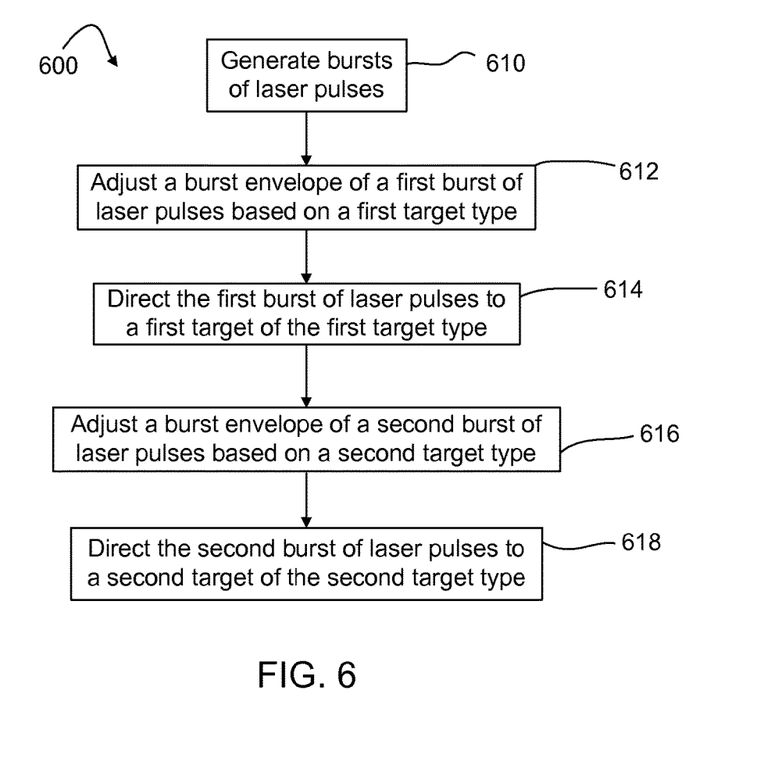
FIG. 6 is a flowchart of a laser micromachining process according to one embodiment.

For example, FIG. 6 is a flowchart of a laser micromachining process 600 according to one embodiment. With reference to FIGS. 1A, 1B and 6, the method includes generating 610 bursts 110 of laser pulses 112 and adjusting 612 a burst envelope 114 of a first burst 110 of laser pulses 112 based on a first target type. The method 600 also includes directing 614 the first burst 110 of laser pulses 112 to a first target of the first type. The method 600 further includes adjusting 616 a burst envelope 114 of a second burst 110 of laser pulses 112 based on a second target type, and directing 618 the second burst 110 of laser pulses 112 to a second target of the second target type. The first target type and/or the second target type may include, for example, a scribing target, a dicing target, an electrically conductive link severing target, a material trimming target, and a via forming target.

Figure 7:
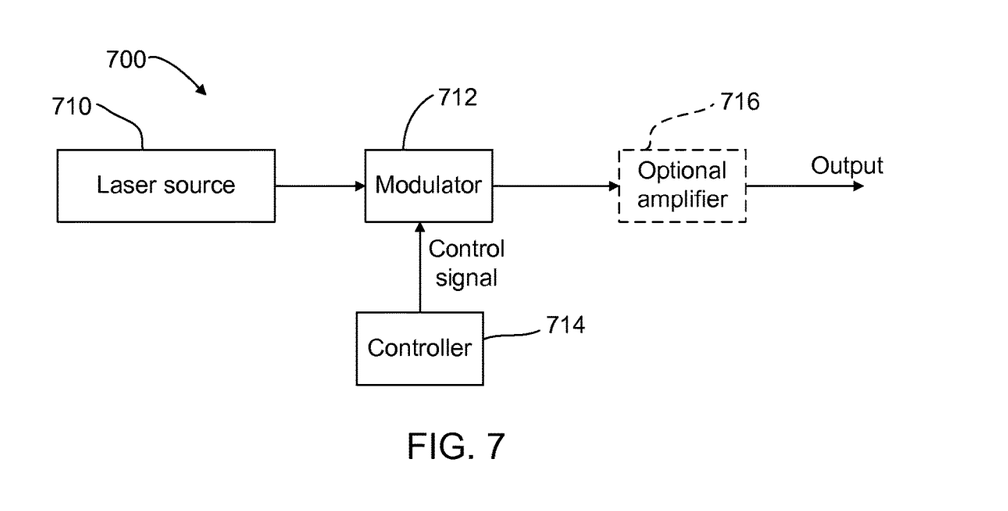
FIG. 7 is a block diagram of a laser system for generating tailored bursts of short or ultrashort laser pulses according to one embodiment.

FIG. 7 is a block diagram of a laser system 700 for generating tailored bursts of short or ultrashort laser pulses according to one embodiment. The laser system 700 includes a laser source 710, a modulator 712, and a controller 714. The system 700 may also include an optional amplifier 716. The laser source 710 generates a series of short or ultrashort, mode-locked laser pulses. The laser source 710 may include, for example, a diode pumped solid state laser or fiber laser. The modulator 712 amplitude modulates the laser pulses provided by the laser source 710.

The modulation is based on a control signal received from the controller 714. Thus, the controller 714 may be programmed with a desired burst envelope for a particular application or target type. The optional amplifier 716 amplifies the tailored burst of laser pulses provided by the modulator 712.

Other system configurations may be used to generate the tailored bursts of short or ultrashort laser pulses. For example, certain embodiments may use the systems and methods disclosed in U.S. patent application Ser. No. 12/354,373, which is assigned to the assignee of the present application. Several such embodiments are described below with respect to FIGS. 8, 9, 10, 11, 12, 13A, 13B, 13C, and 14.

Figure 8:
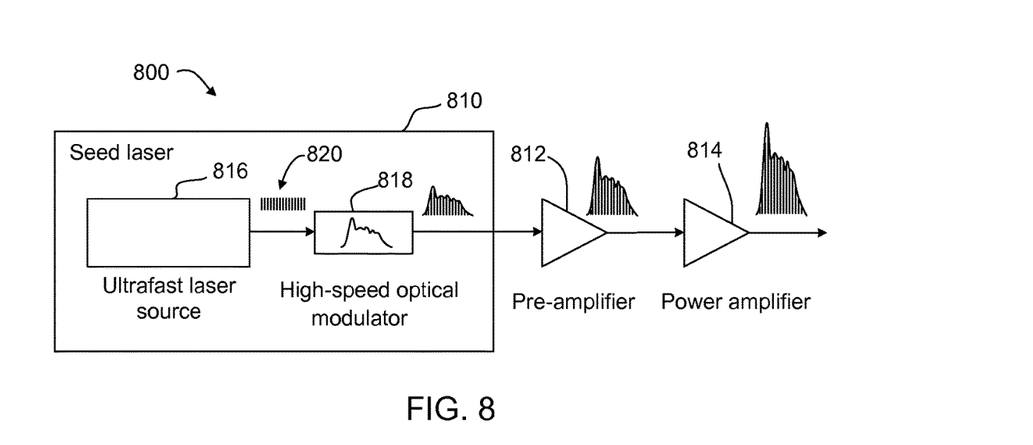
FIG. 8 is a block diagram of a laser system having a programmable burst pulse laser according to one embodiment.

FIG. 8 is a block diagram of a laser system 800 according to one embodiment. The laser system 800 includes a seed laser 810, a pre-amplifier 812, and a power amplifier 814. The seed laser 810 includes an ultrafast laser source 816 and a high-speed optical modulator 818. The ultrafast laser source 816 provides a train of ultrafast laser pulses 820 to the high-speed optical modulator 818. In one embodiment, the temporal pulse width of each ultrafast laser pulse 820 is in a range between approximately 300 femtoseconds and approximately 1 nanosecond.

The ultrafast laser source 816 provides the ultrafast laser pulses 820 at a high repetition rate. In one embodiment, the ultrafast laser source 816 operates at a repetition rate in a range between approximately 1 Hz and approximately 100 kHz. In other embodiments, the repetition rate is in a range between approximately 100 kHz and approximately 80 MHz. An artisan will recognize from the disclosure herein that much higher repetition rates may also be used. For example, in some embodiments repetition rates as high as 500 MHz or higher may be used. In another embodiment, repetition rates may be as high as approximately 10 GHz or higher.

Figure 9:
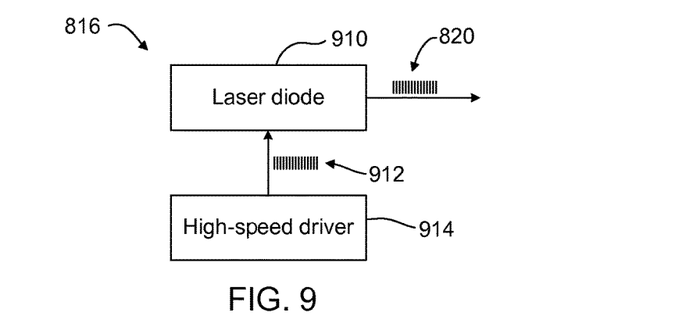
FIG. 9 is a block diagram of an ultrafast laser source according to one embodiment that includes a high-speed distributed feedback diode.

In one embodiment, the ultrafast laser source 816 includes a high-speed ultrafast semiconductor diode. For example, FIG. 9 is a block diagram of an ultrafast laser source 816 according to one embodiment that includes a high-speed distributed feedback (DFB) diode 910. The DFB diode 910 is modulated by a seed pulse signal 912 produced by a high-speed driver 914 to provide at a high repetition rate the train of ultrafast laser pulses 820. In certain embodiments, the laser source 816 includes an optical modulator. For example, the laser source 816 may include a 20 GHz bandwidth modulator capable of providing 50 picosecond pulse widths. An artisan will recognize from the disclosure herein that the optical modulator may operate above or below 20 GHz. For example, in one embodiment the optical modulator may operate at a bandwidth of up to approximately 40 GHz.

Using the DFB diode 910 as the laser source 816 offers wide tunability, narrow linewidth, and high output power in a compact and very rugged setup. For example, a frequency selective element (not shown) within the DFB diode 910, such as a Bragg grating, is integrated into the active section of the semiconductor. Thus, single-frequency operation and high coherence (e.g., a coherence length in a range between approximately 50 m and approximately 200 m) are obtained without any bulk optics, making the DFB diode 910 particularly suitable for use within harsh industrial environments or for airborne applications.

The DFB diode 910 shown in FIG. 9 may be tuned according to certain embodiments by changing either the temperature (e.g., typically at a tuning rate of approximately 25 GHz/K) or the operating current (e.g., typically at a tuning rate of approximately 1 GHz/mA to approximately 2 GHz/mA). While current-tuning is favorable for rapid modulation tasks, thermal tuning has the advantage of providing extremely large mode-hop free tuning ranges (e.g., up to approximately 1200 GHz). Generally, the wavelength of a DFB laser is tuned by varying the laser current or the chip temperature. Electric modulation is suitable for fast frequency scans within a small range (e.g., for linewidths in a range between approximately 0.1 nm and approximately 0.2 nm at modulation frequencies in the kHz to MHz range). Larger tuning ranges of up to approximately 3 nm are realized by varying the laser temperature, typically over an interval of approximately 40° C.

By way of example, the DFB diode 910 may be a DFB diode equipped with polarization maintaining (PM) fiber couplers (not shown) may be obtained from Toptica Photonics, AG of Munich, Germany. As another example, the diode 910 may include an ultrafast gain-switched diode with a direct modulated source providing 50 picosecond pulse widths, as demonstrated by PicoQuant GmbH, of Berlin, Germany.

Figure 10:
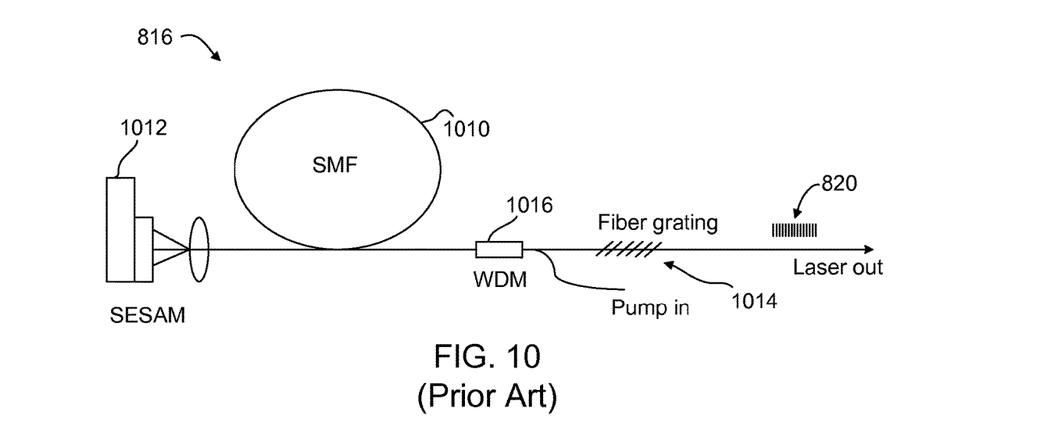
FIG. 10 is a block diagram of a typical fiber mode-locked master oscillator that may be used as the ultrafast laser source of FIG. 8 according to one embodiment.

Returning to FIG. 8, in other embodiments, the ultrafast laser source 816 may include a solid-state ultrafast laser, a passively mode-locked fiber master oscillator, a combination of multi-fiber master oscillators, a passively mode-locked semiconductor laser, or any other high repetition rate ultrafast laser. For example, FIG. 10 is a block diagram of a typical fiber mode-locked master oscillator that may be used as the ultrafast laser source 816 of FIG. 8 according to one embodiment. In the example shown in FIG. 10, the fiber mode-locked master oscillator includes a single mode gain fiber (SMF) 1010 that forms a laser resonator terminated on one end by a semiconductor saturable absorber mirror (SESAM) 1012 and on the other end by wavelength selector such as a fiber grating 1014. The gain fiber 1010 is pumped by, for example, a laser diode (not shown), the output of which is introduced to the resonator through a wavelength division multiplexer (WDM) 1016. In operation, the fiber mode-locked master oscillator shown in FIG. 10 generates the train of ultrafast laser pulses 820 at a high repetition rate, as discussed above. The pulse repetition rate of the fiber mode-locked master oscillator is determined by the resonator's length.

As shown in FIG. 8, the train of ultrafast laser pulses 820 is provided to the high-speed optical modulator 818, which independently adjusts the amplitude of each pulse so as to obtain a desired burst envelope shape for a particular material processing application. The high-speed optical modulator 818 may be programmed to control the temporal spacing of the ultrafast pulses under the envelope, the burst envelope's temporal width, and/or the burst envelope's amplitude and particular shape. The programable burst envelope may be obtained by using, for example, pulse picking (e.g., selecting pulses so as to control the distance between pulses or the pulse repetition frequency), high-speed modulation, seed source eletrical modulation in the case of semiconductor gain-switched ultrafast laser, or a combination of the foregoing. In one embodiment, the high-speed optical modulator 818 includes a Mach-Zehnder interferometer (not shown) that modulates the power of the train of ultrafast laser pulses to obtain a desired burst envelope.

The temporal width of the burst envelope according to one embodiment is in a range between approximately 10 picoseconds and approximately 1 nanosecond. In other embodiments, the temporal width of the burst envelope is in a range between approximately 1 nanosecond and approximately 10 nanoseconds. In other embodiments, the temporal width of the burst envelope is in a range between approximately 10 nanoseconds and approximately 100 nanoseconds. In other embodiments, the temporal width of the burst envelope is in a range between approximately 100 nanoseconds and approximately 1 microsecond. The burst envelope may have other temporal widths depending on the particular application.

In one embodiment, the rise time and/or fall time of the burst envelope is less than 1 nanosecond. For example, the rise time and/or fall time may be in a range between approximately 10 picoseconds and approximately 1 nanosecond. Faster or slower rise/fall times may also be used for different applications. For example, the rise time and/or fall time may be in a range between approximately 1 nanosecond and approximately 5 nanoseconds. The laser system's ability to a provide burst envelope with a fast rise time and/or fall time is useful, for example, to link severing applications because it reduces the risk of generating over craters in the overlying passivation layer.

The pre-amplifier 812 and the power amplifier 814 provide appropriate amplification to the shaped burst of ultrafast laser pulses provided at the ouput of the high-speed optical modulator 818. The pre-amplifier 812 according to certain embodiments may include photonic crystals, LMA gain fiber, or single mode gain fiber. In addition, or in other embodiments, the power amplifier 814 includes a solid-state gain medium. As discussed below, in certain embodiments, the pre-amplifier 812 and the power amplifier 814 may include any combination of fibe or solid state amplifiers.

Figure 11:
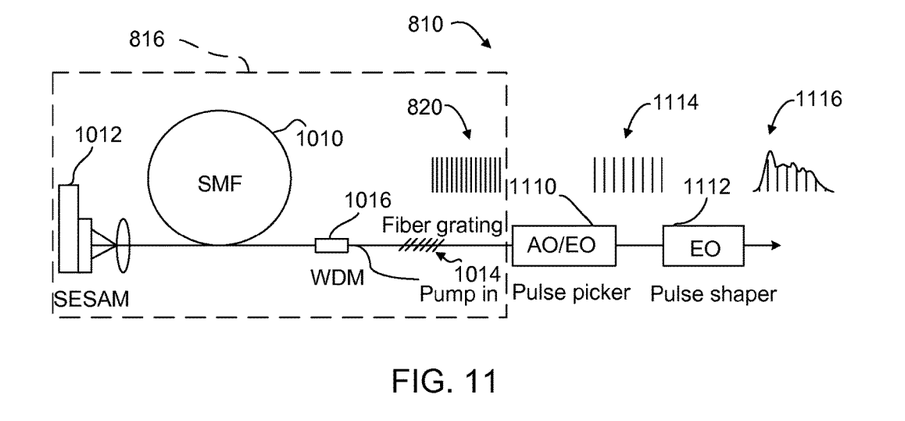
FIG. 11 is a block diagram of a seed laser usable by the laser system to generate shaped burst envelopes according to one embodiment.

FIG. 11 is a block diagram of a seed laser 810 usable by the laser system 800 to generate shaped burst envelopes according to one embodiment. The seed laser 810 shown in FIG. 11 includes an ultrafast laser source 816, a pulse picker 1110, and a pulse shaper 1112. The ultrafast laser source 816 in this embodiment is a fiber mode-locked master oscillator that includes, as discussed above in relation to FIG. 10, the SMF 1010, the SESAM 1012, the fiber grating 1014, and the WDM 1016.

The pulse picker 1110 may include, for example, an acousto-optical (AO) modulator or an electro-optical (EO) modulator that is configured to change the repetition rate of the train of ultrafast pulses 820. As mentioned above, the main mode-lock frequency is determined by the resonator's length, which is fixed for a given oscillator. For example, the mode lock frequency may be approximately 1 GHz, which may not be ideal for processing certain materials. Thus, the pulse picker 1110 passes the pulses provided by the fiber mode-locked master oscillator at a selected rate to lower the repetition rate (e.g., to change it from approximately 1 GHz to approximately 500 MHz or to a much lower rate such as to a few Hertz), as represented in FIG. 11 by the train of ultrafast laser pulses 1114. As another example, additional temporal delay may be added between two ultrafast laser pulses in a burst to allow heat dissipation. Thus, the pulse picker 1110 may be used to selectively change the spacing between ultrafast laser pulses to control heating during material processing.

The pulse shaper 1112 may include, for example, an EO modulator that is configured to selectively provide amplitude modulation to each pulse in the train of ultrafast laser pulses 1114. Thus, the pulse shaper 1112 selectively shapes the burst envelope 1116, as shown in FIG. 11. As discussed in relation to FIG. 8, the shaped burst of laser pulses may then be provided to the pre-amplifier 812 and the power amplifier 814 before being applied to a workpiece.

Repetition rates may be increased and further controlled by selectively combining two or more ultrafast laser sources.

Figure 12:
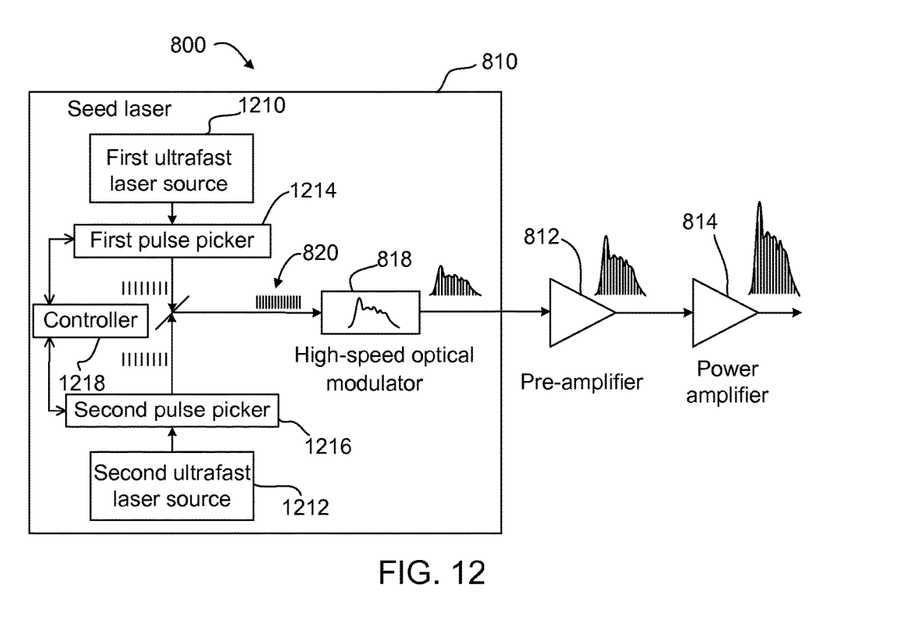
FIG. 12 is a block diagram of a laser system with a seed laser that selectively combines the outputs of a first ultrafast laser source and a second ultrafast laser source according to one embodiment.

For example, FIG. 12 is a block diagram of a laser system 800 with a seed laser 810 that selectively combines the outputs of a first ultrafast laser source 1210 and a second ultrafast laser source 1212 according to one embodiment. The outputs may be combined, for example, the increase the overall repetition rate of the train of ultrafast laser pulses 820 provided to the high-speed optical modulator 818.

The first ultrafast laser source 1210 and the second ultrafast laser source 1212 may each include any of the example ultrafast laser source embodiments discussed herein or otherwise known in the art. In one embodiment, a first pulse picker 1214 may be used to selectively reduce the repetition rate of the first ultrafast laser source 1210, and a second pulse picker 1216 may be used to selectively reduce the repetition rate of the second ultrafast laser source 1212. The seed laser 810 may also include a controller 1218 in communication with the first pulse picker 1214 and the second pulse picker 1216 to selectively control the respective repetition rates. Thus, the controller 1218 controls the overall repetition rate of the train of ultrafast laser pulses 820 as well as the temporal spacing between any two pulses within the train of ultrafast laser pulses 820. As discussed above, the train of ultrafast laser pulses is then provided to the high-speed optical modulator 818 for burst envelope shaping, the pre-amplifier 812, and the power amplifier 814.

Figure 13A:
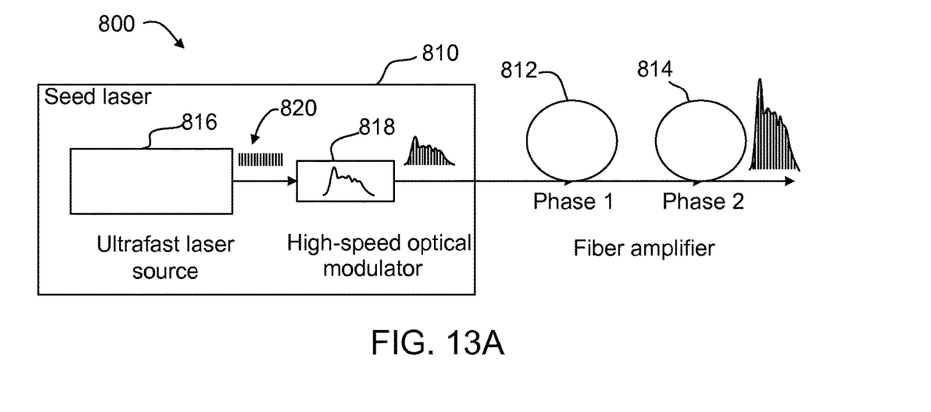
FIGS. 13A, 13B, and 13C are block diagrams of respective laser systems implementing different pre-amplifier (phase 1) and power amplifier (phase 2) configurations according to certain embodiments.
Figure 13B:
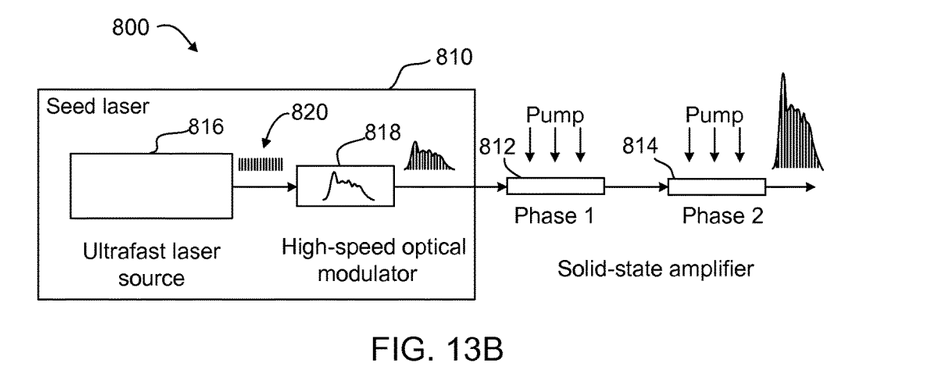
Figure 13C:
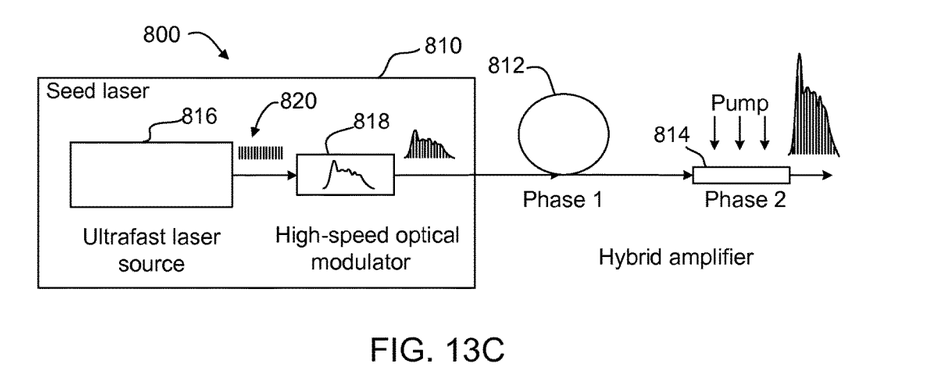

FIGS. 13A, 13B, and 13C are block diagrams of respective laser systems 800 implementing different configurations of pre-amplifiers 812 (phase 1) and power amplifiers 814 (phase 2) according to certain embodiments. The example embodiments shown in FIGS. 13A, 13B, and 13C each include the seed laser 810, as discussed above in relation to FIG. 8, to provide selectively shaped burst envelopes. In FIG. 13A, the pre-amplifier 812 and the power amplifier 814 each include one or more gain fiber amplifiers. In FIG. 13B, the pre-amplifier 812 and the power amplifier 814 each include one or more solid-state amplifiers. In FIG. 13C, a hybrid amplifier is used in which the pre-amplifier 812 includes one or more gain fiber amplifiers and the power amplifier 814 includes one or more solid-state amplifiers. Although not shown, in other embodiments, the hybrid amplifier shown in FIG. 13C may be reversed such that the pre-amplifier 812 includes solid-state amplifiers and the power amplifier 814 includes gain fiber amplifiers. In other embodiments, the pre-amplifier 812 and/or the power amplifier 814 may include a combination of gain fiber amplifiers and solid-state amplifiers. Each of the gain fiber amplifiers may include, for example, Ytterbium (Yb), Erbium (Er), or Neodymium (Nd) glass. While only two amplifier stages are shown in each embodiment, amplifier stages may be added to produce at least 1 kW of peak power output according to certain embodiments. The hybrid or "tandem" configurations are more robust at peak power levels greater than 1 kW because they include bulk solid-state amplifiers.

Figure 14:
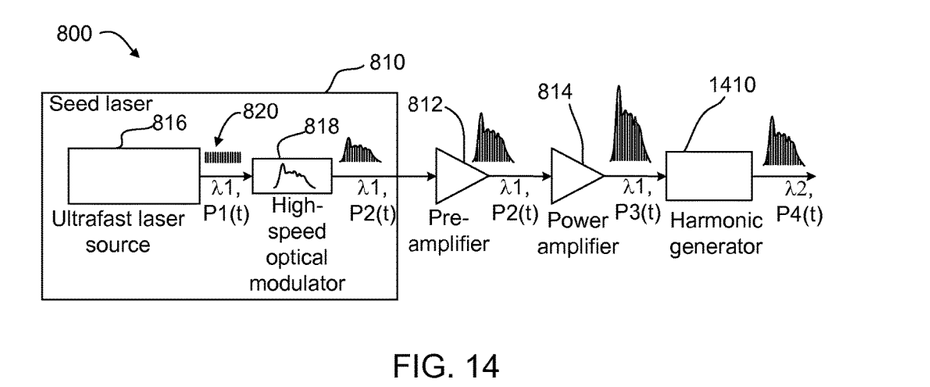
FIG. 14 is a block diagram of a laser system that includes a harmonic generator for wavelength conversion according to one embodiment.

FIG. 14 is a block diagram of a laser system 800 that includes a harmonic generator 1410 for wavelength conversion according to one embodiment. The laser system 800 includes the seed laser 810 having the ultrafast laser source 816 as discussed above in relation to FIG. 8. The ultrafast laser source 816 may be a linearly polarized, narrow bandwidth source. For example, the ultrafast laser source 816 may have a bandwidth that is less than approximately 1 nm, and the amplifiers 812, 814 may be configured to maintain the polarization, which is suitable for nonlinear conversion to shorter wavelengths by harmonic generation or to longer wavelengths by Raman or OPO. Thus, the harmonic generator 1410 may be used to obtain wavelength ranges such as green, ultraviolet (UV), or deep ultraviolet (DUV).

The embodiments disclosed herein provide unique advantages for laser processing of materials including, for example, for processing of multi-layer semiconductor devices or flat panel devices where the desire is to process one or more of these layers without causing damage to the device substrate. Conventional nanosecond laser pulses may not be suitable for processing of sub-micron sized features in layered devices because the resulting heat affected zone is large and may damage adjacent and underlying structures, or because different layers require different laser parameters to deliver an acceptable process quality, which a single nanosecond pulse may not deliver. Conventional picosecond lasers may also not be suitable for processing of semiconductor layers because the large peak powers required may cause significant heating to the underlying substrate. Thus, the burst pulse laser 810 disclosed herein combines the useful features of both nanosecond and picosecond pulse types.

It will be understood by those having skill in the art that many changes may be made to the details of the above-described embodiments without departing from the underlying principles of the invention. The scope of the present invention should, therefore, be determined only by the following claims.

The invention claimed is:

1. A laser micromachining method comprising:
    generating, using an ultrafast laser source, a burst of laser pulses;
    adjusting respective amplitudes of individual laser pulses within the burst of laser pulses, using a high-speed optical modulator, to produce a selectively shaped single burst envelope for processing a target location of a workpiece, the target location including a first layer overlying a second layer, wherein the first layer and the second layer comprise different materials with different laser processing characteristics, the adjusting comprising:
        selectively adjusting one or more first laser pulses within the single burst envelope to a first amplitude based on processing characteristics of a first layer at a target location; and
        selectively adjusting one or more second laser pulses within the single burst envelope to a second amplitude based on processing characteristics of a second layer at the target location; and
    directing the amplitude adjusted burst of laser pulses to the target location, the single burst envelope of laser pulses processing both the first layer and the second layer at the same target location.

2. The method of claim 1, wherein generating the burst of laser pulses comprises:
    generating mode-locked laser pulses comprising respective temporal pulse widths that are less than or equal to approximately 1 nanosecond.

3. The method of claim 2, wherein the respective temporal pulse widths are in a range between approximately 1 nanosecond and approximately 100 femtoseconds.

4. The method of claim 2, further comprising:
    generating the laser pulses at a repetition rate in a range between approximately 100 kHz and approximately 500 MHz.

5. The method of claim 1, wherein generating the burst of laser pulses comprises:
    generating the burst within a temporal width in a range between approximately 1 nanosecond and approximately 1 microsecond.

6. The method of claim 5, wherein the target location is selected from a group of target types comprising: an electrically conductive link severing target, a material trimming target, a via forming target, a scribing target, and a dicing target.

* * * * *